(12) United States Patent
Bharadwaja et al.

(10) Patent No.: US 12,548,451 B2
(45) Date of Patent: Feb. 10, 2026

(54) SYSTEMS AND METHODS FOR IMPROVING SITUATIONAL AWARENESS OF AIRCRAFT WITHIN AN AIRSPACE

(71) Applicant: THE BOEING COMPANY, Arlington, VA (US)

(72) Inventors: Ajaya Srikanta Bharadwaja, Karnataka (IN); Chaitra Jagadeesh, Karnataka (IN)

(73) Assignee: The Boeing Company, Arlington, VA (US)

(*) Notice: Subject to any disclaimer, the term of this patent is extended or adjusted under 35 U.S.C. 154(b) by 197 days.

(21) Appl. No.: 18/336,121

(22) Filed: Jun. 16, 2023

(65) Prior Publication Data

US 2024/0420576 A1    Dec. 19, 2024

(51) Int. Cl.
*G08G 5/21* (2025.01)
*G08G 5/25* (2025.01)
*G08G 5/72* (2025.01)

(52) U.S. Cl.
CPC ........... *G08G 5/21* (2025.01); *G08G 5/25* (2025.01); *G08G 5/723* (2025.01)

(58) Field of Classification Search
None
See application file for complete search history.

(56) References Cited

U.S. PATENT DOCUMENTS

| | | | |
|---|---|---|---|
| 9,620,024 B1 * | 4/2017 | Mottram | G08G 5/32 |
| 10,302,759 B1 | 5/2019 | Arteaga | |
| 10,993,084 B2 * | 4/2021 | Macrae | H04N 21/6543 |
| 2016/0170025 A1 * | 6/2016 | Johnson | G01S 19/14 |
| | | | 342/357.4 |
| 2016/0275801 A1 | 9/2016 | Kopardekar | |
| 2017/0025023 A1 * | 1/2017 | Goddemeier | G08G 5/26 |
| 2018/0100914 A1 * | 4/2018 | Beard | G01S 5/0226 |
| 2020/0027358 A1 | 1/2020 | Fine | |
| 2020/0320887 A1 * | 10/2020 | Duan | G08G 5/21 |
| 2021/0247513 A1 * | 8/2021 | Song | G08G 5/80 |
| 2022/0122472 A1 * | 4/2022 | Vining | G06N 20/00 |
| 2024/0257645 A1 * | 8/2024 | Apcar | H04B 7/18508 |

FOREIGN PATENT DOCUMENTS

EP    4075409    10/2022

OTHER PUBLICATIONS

Extended European Search Report for EP 24182356.6-1009, dated Nov. 29, 2024.
Communication re EP App. No. 24182356.6-1009, dated Nov. 20, 2025.

* cited by examiner

*Primary Examiner* — Amelia Vorce
(74) *Attorney, Agent, or Firm* — Joseph M. Butscher; Carroll, Hoette & Butscher, LLC

(57) ABSTRACT

A system and a method include a control unit configured to determine situational information regarding a plurality of aircraft within an airspace. The control unit is configured to determine the situational information based on automatic dependent surveillance-broadcast (ADS-B) signals output by the plurality of aircraft and received by an ADS-B receiver of a tracking sub-system.

18 Claims, 3 Drawing Sheets

SYSTEMS AND METHODS FOR IMPROVING SITUATIONAL AWARENESS OF AIRCRAFT WITHIN AN AIRSPACE

FIELD OF THE DISCLOSURE

Examples of the present disclosure generally relate to systems and methods for improving situational awareness of aircraft within an airspace.

BACKGROUND OF THE DISCLOSURE

Aircraft are used to transport passengers and cargo between various locations. Numerous aircraft depart from and arrive at a typical airport every day.

Various aircraft within a particular airspace are monitored by air traffic control, such as can be located at an airport. Aircraft operating in an airspace without surveillance are frequently held at non-optimal flight levels due to conflicting traffic at the optimal flight level and at flight levels between the current and optimal flight level. During peak travel times, air traffic can produce local congestion at common cruising altitudes. As such, some aircraft may be required to fly at altitudes other than those requested, thereby reducing fuel efficiency. Large, procedural separation standards used in non-surveillance airspace (such as oceanic airspace) typically exacerbate the problem. Also, separation minima is high in oceanic regions, which often limits the number of aircraft that can fly in such regions at the same time. Further, because pilots of such aircraft have little to no knowledge of other flights, the aircraft typically follow the separation minima.

Additionally, according to procedures defined for Air Navigation Services Doc4444 ATM/501 (section 15.2.2.3), in oceanic airspace, if air traffic control clearance cannot be obtained, a pilot is then advised to: (a) leave an assigned route or track by initially turning 90 degrees to the right or to the left, (b) follow a turn climb or descend to select a flight level which differs from those normally used by 150 m (500 ft), (c) establish communications with and alert nearby aircraft, (d) maintain a watch for conflicting traffic both visually and by reference to Airborne Collision Avoidance System (ACAS), (e) turn on all aircraft exterior lights, (f) keep a secondary surveillance radar (SSR) transponder on at all times, and (g) take action as necessary to ensure the safety of the aircraft. In relation to (a) and (b), a pilot generally does not have knowledge of surrounding aircraft, because the aircraft typically loses communication with air traffic control during this time.

In-Trail Procedure (ITP) is a method of using precise automatic dependent surveillance-broadcast (ADS-B) location data that allows altitude changes for an aircraft. A flight crew operating ITP-equipped aircraft use specialized algorithms that calculate ITP distance for the flight crew. ITP-equipped and trained flight crews can request ITP maneuvers to their preferred flight level, and because of ADS-B precision, less separation is required for ITP maneuvers. However, the ITP algorithms calculate the ITP distance based on the position data received by other flights that have ADS-B transmitters on-board. An aircraft without an ADS-B receiver typically cannot use ITP.

Pairwise Trajectory Management (PTM) is an advanced approach that combines airborne ADS-B and ground-based capabilities to enable the implementation of airborne pairwise spacing capabilities in oceanic regions. An air traffic controller, using ground-based systems, issues a pair-specific PTM clearance to a PTM-equipped aircraft.

A pre-requisite for both ITP and PTM is that aircraft typically must have onboard ADS-B IN capability. That is, with both ITP and PTM, the aircraft typically must have ADS-B receivers that are configured to receive ADS-B signals output from other aircraft. Notably, there currently is no mandate for aircraft to have onboard ADS-B IN capability. As such, there are a significant number of aircraft without ADS-B IN capability. Because certain aircraft lack such capability, these aircraft often lack situational awareness with respect to other aircraft within an airspace. Further, installing ADS-B receivers on aircraft is costly, and typically requires re-certification.

SUMMARY OF THE DISCLOSURE

A need exists for a system and a method that provide improved situational awareness to aircraft within an airspace. Further, a need exists for a system and a method for communicating an optimum altitude for an aircraft to fly within an airspace, which in turn increases fuel efficiency and improves situational awareness.

With those needs in mind, certain examples of the present disclosure provide a system including a control unit configured to determine situational information regarding a plurality of aircraft within an airspace. The control unit is configured to determine the situational information based on automatic dependent surveillance-broadcast (ADS-B) signals output by the plurality of aircraft and received by an ADS-B receiver of a tracking sub-system.

In at least one example, the control unit is further configured to output one or more situational signals. The one or more situational signals include at least a portion of the situational information. In at least one example, the control unit is configured to output the one or more situational signals to the one or more of the plurality of aircraft.

In at least one example, the one or more situational signals include one or more recommended flight aspects for one or more of the aircraft based on the tracked positions of the plurality of aircraft within the airspace. The one or more recommended flight aspects can include a recommended altitude.

One or more of the plurality of aircraft can be configured to be automatically controlled according to the one or more situational signals.

In at least one example, one or more of the plurality of aircraft are unable to receive the ADS-B signals. In at least one example, the control unit is configured to determine the situational information independently of any of the plurality of aircraft having a capability of receiving the ADS-B signals.

In at least one example, the control unit is an artificial intelligence or machine learning system.

Certain examples of the present disclosure provide a method including determining, by a control unit, situational information regarding a plurality of aircraft within an airspace, wherein said determining is based on automatic dependent surveillance-broadcast (ADS-B) signals output by the plurality of aircraft and received by an ADS-B receiver of a tracking sub-system.

Certain examples of the present disclosure provide a non-transitory computer-readable storage medium comprising executable instructions that, in response to execution, cause one or more control units comprising a processor, to perform operations comprising: determining situational information regarding a plurality of aircraft within an airspace, wherein said determining is based on automatic dependent surveillance-broadcast (ADS-B) signals output by the plurality of aircraft and received by an ADS-B receiver of a tracking sub-system; and outputting one or more situational signals, wherein the one or more situational signals include at least a portion of the situational information, and wherein the one or more situational signals include one or more recommended flight aspects for one or more of the aircraft based on the tracked positions of the plurality of aircraft within the airspace.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

ADS-B IN is a capability of an aircraft to receive information from other aircraft that have ADS-B OUT capability. ADS-B IN is the ability to receive ADS-B signals, while ADS-B OUT is the ability to output ADS-B signals. Many aircraft have ADS-B OUT capability, but not ADS-B IN capability. While certain regulatory authorities mandate ADS-B OUT capability, ADS-B IN capability is currently not mandatory. As such, aircraft typically broadcast their position and other information, via ADS-B OUT signals, while only the aircraft with ADS-B IN capability are able to receive this information. Knowing position information of other aircraft within an airspace will not only help pilots to be situationally aware, but also allow for informed decisions in case the pilot needs to deviate from an intended path.

Examples of the present disclosure provide systems and methods that provide a virtual ADS-B IN capability for the aircraft that do not have actual ADS-B receivers configured to receive ADS-B IN signals.

Figure 1:
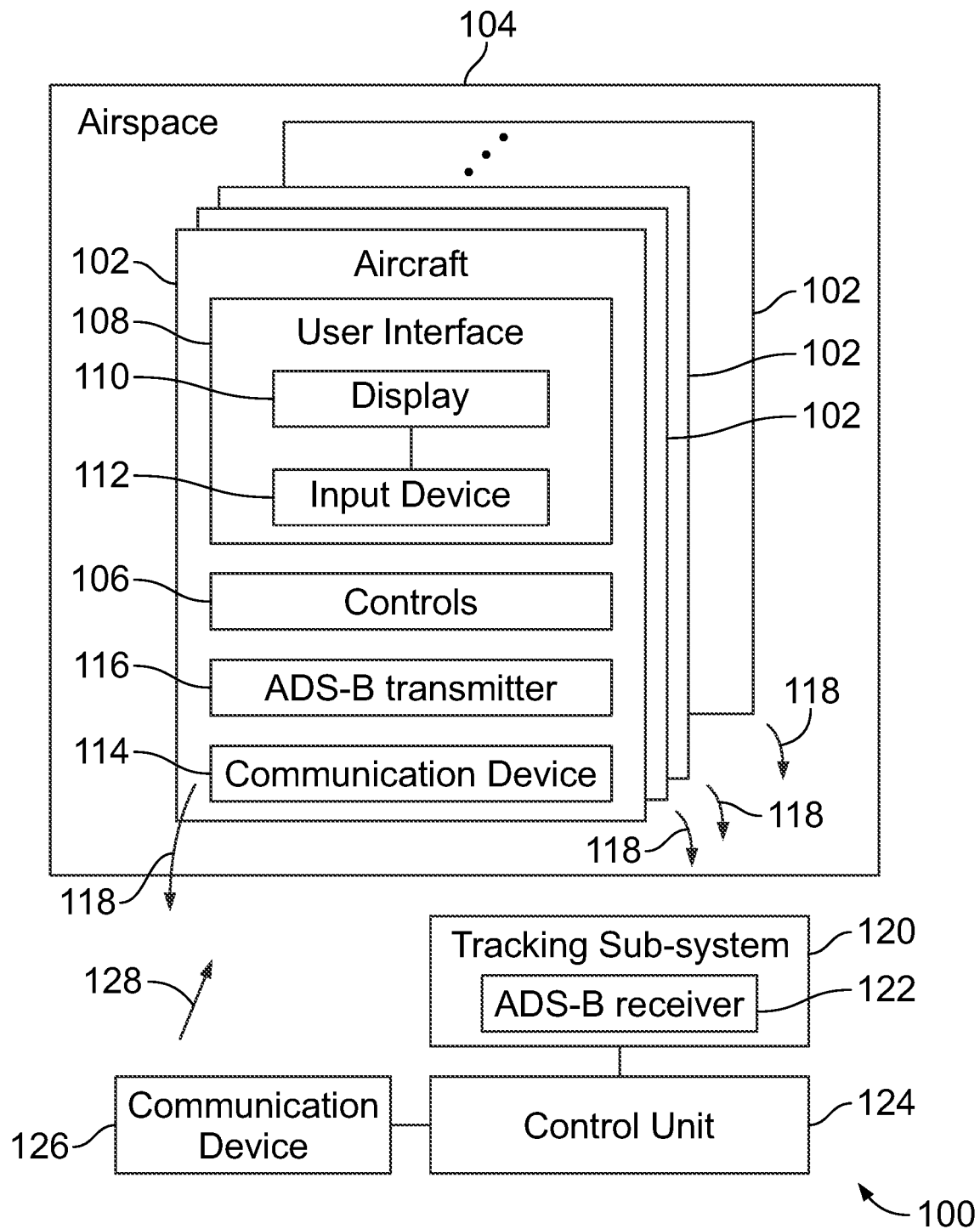
FIG. 1 illustrates a schematic block diagram of a system for providing situational awareness to aircraft within an airspace, according to an example of the present disclosure.

FIG. 1 illustrates a schematic block diagram of a system 100 for providing situational awareness to aircraft 102 within an airspace 104, according to an example of the present disclosure. The airspace 104 can be within a particular region, such as over an ocean. As another example, the airspace 104 can be within a predetermined distance of a particular location, such as within 100 miles of one or more airports. As another example, the airspace 104 can be over a continent. As another example, the airspace 104 can be over a state or group of states. As another example, the airspace 104 can be a hemisphere. As another example, the airspace 104 can be in relation to an entirety of the Earth.

Numerous aircraft 102 are within the airspace 104. The aircraft 102 fly within the airspace 104 at particular headings, speeds, altitudes, and the like. Each of the aircraft 102 includes controls 106 that one or more members of a flight crew operate to control operation of the aircraft 102. The aircraft 102 also include a user interface 108, which can be part of, or otherwise in communication with, a flight computer. As another example, the user interface 108 can be part of a separate computer workstation aboard an aircraft 102. As another example, the user interface 108 can be a handheld device, such as a smart phone, tablet, or the like, within an aircraft 102. The user interface 108 includes a display 110, such as an electronic monitor, in communication with an input device 112, such as one or more of a keyboard, mouse, stylus, touchscreen interface, and/or the like. The aircraft 102 also includes a communication device 114, such as one or more antennas, transceivers, radios, and/or the like, such as allow the aircraft 102 to communicate with air traffic control, for example.

The aircraft 102 also include an ADS-B transmitter 116. The ADS-B transmitter 116 is configured to output an ADS-B OUT signal 118. The ADS-B OUT signal 118 provides information regarding the aircraft 102 within the airspace 104. For example, the ADS-B OUT signal 118 provides position, heading, speed, altitude, and the like for the aircraft 102 within the airspace 104. In at least one example, at least one of the aircraft 102 within the airspace 104 does not include an ADS-B receiver. As such, at least one of the aircraft 102 is unable to receive ADS-B IN signals from other aircraft 102 within the airspace 104.

The system 100 includes a tracking sub-system 120 that is configured to receive the ADS-B OUT signals 118 from the aircraft 102. The tracking sub-system 120 includes an ADS-B receiver 122 that is configured to receive the ADS-B OUT signals 118 from the aircraft 102. As such, the tracking sub-system 120 has ADS-B IN capability, in that it is configured to receive and monitor the ADS-B OUT signals 118 from the aircraft 102 within the airspace 104. Neither the tracking sub-system 120, nor the ADS-B receiver 122 is onboard the aircraft 102. Instead, the tracking sub-system 120 including the ADS-B receiver 122 is at a monitoring location that is separate and distinct from the aircraft 102 within the airspace 104.

The tracking sub-system 120 is an ADS-B tracking sub-system that determines a current position of an aircraft 102 via satellite navigation through a positional signal (that is, the ADS-B OUT signal 118) of the aircraft 102 output by the ADS-B transmitter 116, which is received by the ADS-B receiver 122. The ADS-B transmitter 116 periodically outputs the ADS-B OUT signal 118, which includes information about the aircraft 102, such as identification details, current position, current altitude, and current velocity. The tracking sub-system 120 receives the ADS-B OUT signals 118 and determines a current and real time position, heading, velocity, and the like of the aircraft 102.

The tracking sub-system 120 receives the ADS-B OUT signals 118 from all of the aircraft 102 within the airspace 104, via the ADS-B receiver 122, and tracks the positions, headings, speeds, altitudes, and the like of each of the aircraft 102 through the received ADS-B OUT signals 118. A control unit 124 is in communication with the tracking sub-system 120, such as through one or more wired or wireless connections. In at least one example, the control unit 124 can be part of the tracking sub-system 120. As another example, the control unit 124 is separate and distinct from the tracking sub-system 120. The control unit 124 can be in communication with the tracking sub-system 120 through direct communication, a network, the Internet, and/or the like.

The control unit 124 is also in communication with a communication device 126, such as through one or more wired or wireless connections. In at least one example, the control unit 124 includes the communication device 126. As another example, the control unit 124 is separate and distinct from the communication device 126. The communication device 126 can be one or more antennas, transceivers, and/or the like. The communication device 126 is configured to allow the control unit 124 to communicate with the aircraft 102, such as by outputting communication signals that are received by the communication devices 114 of the aircraft 102.

In operation, the tracking sub-system 120 receives the ADS-B OUT signals 118 via the ADS-B receiver 122, and tracks the aircraft 102 within the airspace 104. For example, the tracking sub-system 120 is able to track the current position, heading, speed, altitude, and the like of the various aircraft 102 within the airspace 104. The control unit 124 determines the locations of the aircraft 102 within the airspace 104 by analyzing the tracked aircraft 102 as determined by the tracking sub-system 120. The control unit 124 then outputs one or more situational signals 128 to one or more of the aircraft 102 within the airspace 104. The situational signal(s) 128 include situational information regarding the aircraft 102 in relation the other aircraft 102 within the airspace 104. For example, the situational signal(s) 128 include a separation distance between the aircraft 102 and the other aircraft within the airspace 104. In at least one example, the situational signal(s) 128 also include an altitude of the other aircraft 102 in relation to the aircraft 102.

Optionally, the control unit 124 can output the situational signal(s) 128 to a particular medium or location, such as a cloud-based server, which is accessible by the operators of the aircraft 102. As such, the control unit 124 may not output the signals to each of the aircraft 102, but may rather output the signals to a centralized location accessible by operators of the aircraft 102.

As described herein, the control unit 124 provides the aircraft 102 within the airspace 104 virtual ADS-B IN capability, such as for aircraft 102 without an ADS-B receiver. In particular, the control unit 124 compiles the tracked positions of the aircraft 102 within the airspace 104, as determined by the tracking sub-system 120, and communicates such information with the aircraft 102 within the airspace 104.

In at least one further example, the situational signal(s) 128 also include a recommendation for one or more flight aspects for a particular aircraft 102 within the airspace 104. For example, the control unit 124 can determine the separation distances, altitudes, and the like for the aircraft 102 within the airspace, and based on such information, provide a recommendation, with the situational signal(s) 128, to the aircraft 102 with respect to an optimum separation distance, an optimum altitude, and the like, Such information can be used to improve fuel efficiency, allow for an increased number of aircraft 102 within the airspace 104, and the like.

Information regarding the situational signal(s) 128 can be shown and/or broadcast through the user interface 108 of the aircraft 102. For example, the display 110 can show the separation distances, altitudes, and the like of the other aircraft 102 in relation to a particular aircraft 102. The display 110 can also show recommended separation distances and altitudes for the aircraft 102.

In at least one example, the aircraft 102 can be automatically controlled, such as without human intervention, based on the situational signal(s) 128. For example, the situational signal(s) 128 can be received by the aircraft 102, and the controls 106 automatically operated according to the situational signal(s) 128. Optionally, the aircraft 102 are not automatically controlled based on the situational signal(s) 128.

In at least one example, the control unit 124 provides the situational signals 128 for all of the aircraft 102 within a medium accessible by the aircraft 102. For example, the situational signals 128 can be provided in a cloud-based server, of which the aircraft 102 can gain access. The control unit 124 can store the situational signals 128 for all of the aircraft 102 within the cloud-based server. The information within the situational signals 128 can be used by pilots of the aircraft 102 to cross-correlate the positions and trajectories of all the aircraft 102 within the airspace 104, and allow the pilots to identify flight levels (that is, altitudes) that are advantageous in relation to fuel efficiency, for example. In at least one example, the situational signals 128 can be sent to the aircraft 102 through the Aircraft Communications Addressing and Reporting System (ACARS).

Examples of the present disclosure provide systems and methods that significantly enhance situational awareness for pilots, as well as reduce work load of air traffic controllers. Further, by determining optimal altitudes, for example, fuel efficiency of the aircraft 102 can be increased, and $CO_2$ emission can be reduced. Further, the systems and methods described herein allow pilots to make informed decisions during periods when communication with air traffic control may be lost, such as when flying within oceanic airspace. Additionally, the systems and methods described herein increase airspace efficiency, and enable a higher density of aircraft within a particular airspace without compromising safety.

As described herein, the system 100 includes the control unit 124 configured to determine situational information (for example, separation distances, altitudes, speeds, and/or the like) regarding a plurality of aircraft 102 within the airspace 104. The control unit 124 is configured to determine the situational information based on automatic dependent surveillance-broadcast (ADS-B) signals (such as the ADS-B OUT signals 118) output by the plurality of aircraft 102 and received by the ADS-B receiver 122 of the tracking sub-system 120. In at least one example, the control unit 124 is further configured to output one or more situational signals 128. The one or more situational signals 128 include at least a portion of the situational information. In at least one example, the control unit 124 is configured to output the one or more situational signals 128 to the one or more of the plurality of aircraft 102. As another example, the control unit 124 is configured to output the one or more situational signals 128 to an accessible medium, such as a cloud-based server. In at least one example, the situational signals 128 include recommended flight aspects for one or more of the aircraft 102 based on the tracked positions of the plurality of aircraft 102 within the airspace 104. The recommended flight aspects can include a recommended altitude, for example. In at least one example, one or more of the plurality of aircraft 102 are unable to receive the ADS-B signals. That is, such aircraft do not include an ADS-B receiver.

In at least one example, the control unit 124 is configured to determine the situational information independently of any of the plurality of aircraft 102 having a capability of receiving the ADS-B signals. That is, the control unit 124 determines the situational information whether or not the aircraft 102 have ADS-B receivers (in stark contrast to ITP and PTM, as described above). The situational awareness as determined by the control unit 124 does not rely on any of the aircraft 102 having ADS-B receivers that receive ADS-B signals from other aircraft.

Figure 2:
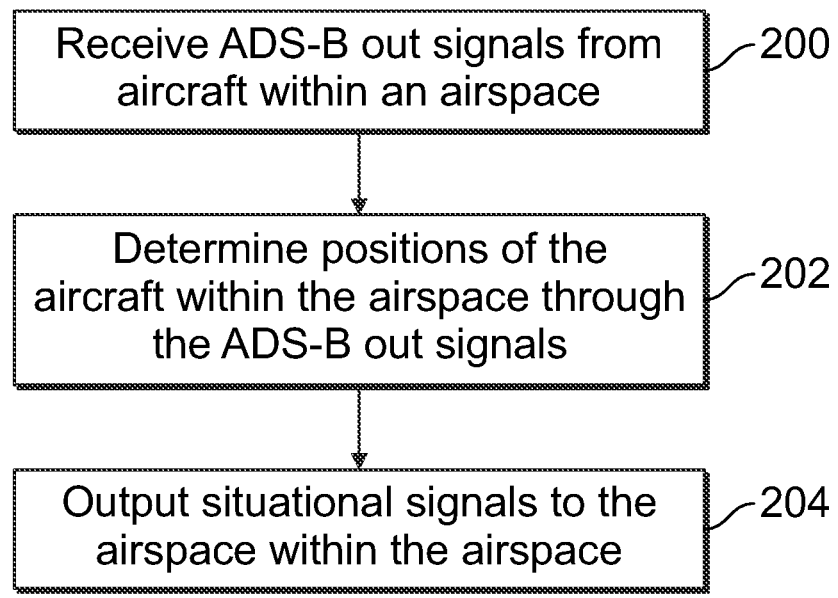
FIG. 2 illustrates a flow chart of a method for providing situational awareness to aircraft within an airspace, according to an example of the present disclosure.

FIG. 2 illustrates a flow chart of a method for providing situational awareness to aircraft within an airspace, according to an example of the present disclosure. Referring to FIGS. 1 and 2, at 200, the ADS-B receiver 122 of the tracking sub-system 120 receives the ADS-B OUT signals 118 from the aircraft 102 within the airspace 104. At 202, the tracking sub-system 120 determines the positions (including altitudes and relative distances) of the aircraft 102 within the airspace 104 through the ADS-B OUT signals 118. At 204, the control unit 124 outputs the situational signals 128, such as to the aircraft 102 within the airspace 104. The situational signals 128 include information that is indicative of the positions of the aircraft 102 as determined by the tracking sub-system 120. In this manner, the systems and methods provide ADS-B situational awareness even for aircraft 102 that do not include ADS-B receivers configured to receive ADS-B signals. The situational signals 128 can also include flight aspect recommendations, such as a recommended altitude and/or separation distance in relation to one or more other aircraft 102.

Figure 3:
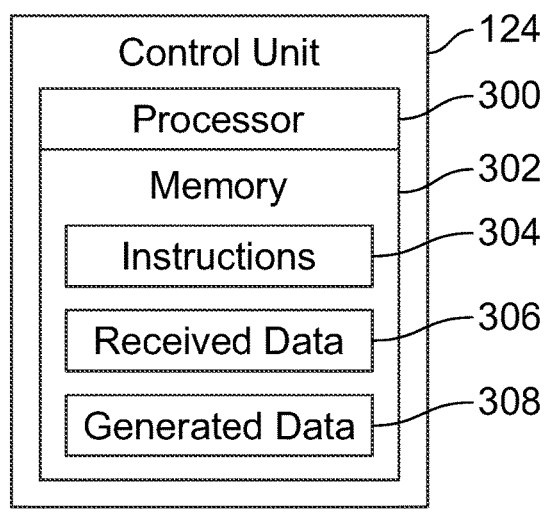
FIG. 3 illustrates a schematic block diagram of a control unit, according to an example of the present disclosure.

FIG. 3 illustrates a schematic block diagram of the control unit 124, according to an example of the present disclosure. In at least one example, the control unit 124 includes at least one processor 300 in communication with a memory 302. The memory 302 stores instructions 304, received data 306, and generated data 308. The control unit 124 shown in FIG. 3 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 124 may be or include one or more processors that are configured to control operation, as described herein.

The control unit 124 is configured to execute a set of instructions that are stored in one or more data storage units or elements (such as one or more memories), in order to process data. For example, the control unit 124 may include or be coupled to one or more memories. The data storage units may also store data or other information as desired or needed. The data storage units may be in the form of an information source or a physical memory element within a processing machine.

The set of instructions may include various commands that instruct the control unit 124 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 124. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 124 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-3, examples of the subject disclosure provide systems and methods that allow large amounts of data to be quickly and efficiently analyzed by a computing device. For example, the control unit 124 can analyze various aspects of numerous aircraft 102 within the airspace 104 during a particular time period. As such, large amounts of data, which may not be discernable by human beings, are being tracked and analyzed. The vast amounts of data are efficiently organized and/or analyzed by the control unit 124, as described herein. The control unit 124 analyzes the data in a relatively short time in order to quickly and efficiently determine situational information for all of the aircraft 102 within the airspace 104. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the system 100, such as the control unit 124, provide and/or enable a computer system to operate as a special computer system for providing situational awareness information for the aircraft 102 within the airspace 104. The control unit 124 improves upon standard computing devices by determining such information in an efficient and effective manner.

In at least one example, all or part of the systems and methods described herein may be or otherwise include an artificial intelligence (AI) or machine-learning system that can automatically perform the operations of the methods also described herein. For example, the control unit 124 can be an artificial intelligence or machine learning system.

These types of systems may be trained from outside information and/or self-trained to repeatedly improve the accuracy with how data is analyzed to determine the situational information for aircraft 102 within the airspace 104. Over time, these systems can improve by determining such information with increasing accuracy and speed, thereby significantly reducing the likelihood of any potential errors. For example, the AI or machine-learning systems can learn and determine optimized separation distances and altitudes for the aircraft 102 within the airspace 104. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of the situational information. The training minimizes conflicts and interference by performing an iterative training algorithm, in which the systems are retrained with an updated set of data (for example, data received before, during, and/or after each flight of the aircraft 102) and based on the feedback examined prior to the most recent training of the systems. This provides a robust analysis model that can better determine situational information in a cost effective and efficient manner.

Figure 4:
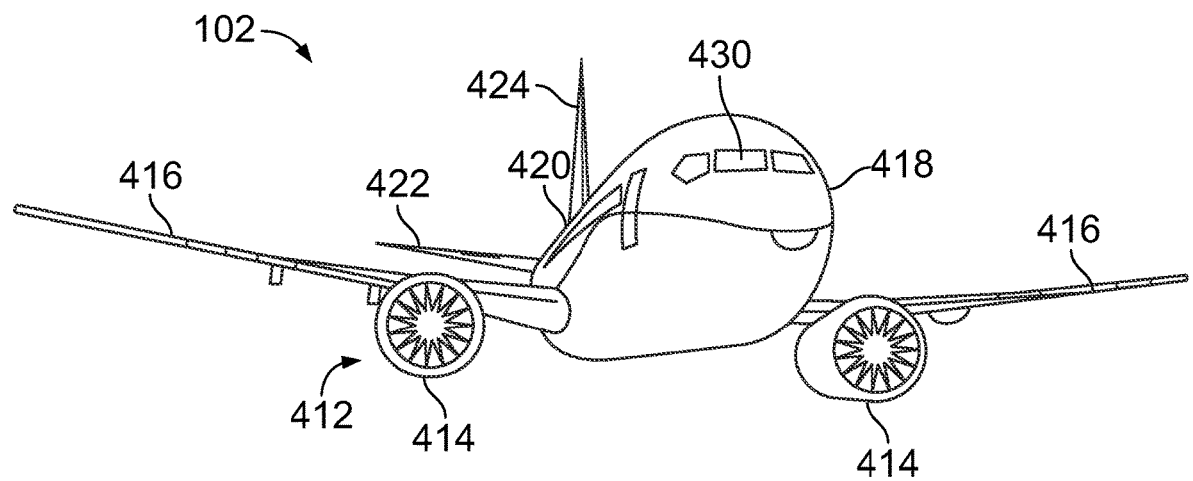
FIG. 4 illustrates a perspective front view of an aircraft, according to an example of the present disclosure.

FIG. 4 illustrates a perspective front view of an aircraft 102, according to an example of the present disclosure. The aircraft 102 includes a propulsion system 412 that includes engines 414, for example. Optionally, the propulsion system 412 may include more engines 414 than shown. The engines 414 are carried by wings 416 of the aircraft 102. In other examples, the engines 414 may be carried by a fuselage 418 and/or an empennage 420. The empennage 420 may also support horizontal stabilizers 422 and a vertical stabilizer 424. The fuselage 418 of the aircraft 102 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 4 shows an example of an aircraft 102. It is to be understood that the aircraft 102 can be sized, shaped, and configured differently than shown in FIG. 4.

Further, the disclosure comprises examples according to the following clauses:

Clause 1. A system comprising:
a control unit configured to determine situational information regarding a plurality of aircraft within an airspace, wherein the control unit is configured to determine the situational information based on automatic dependent surveillance-broadcast (ADS-B) signals output by the plurality of aircraft and received by an ADS-B receiver of a tracking sub-system.

Clause 2. The system of Clause 1, wherein the control unit is further configured to output one or more situational signals, wherein the one or more situational signals include at least a portion of the situational information.

Clause 3. The system of Clause 2, wherein the control unit is configured to output the one or more situational signals to the one or more of the plurality of aircraft.

Clause 4. The system of Clauses 2 or 3, wherein the one or more situational signals include one or more recommended flight aspects for one or more of the aircraft based on the tracked positions of the plurality of aircraft within the airspace.

Clause 5. The system of Clause 4, wherein the one or more recommended flight aspects include a recommended altitude.

Clause 6. The system of any of Clauses 2-5, wherein one or more of the plurality of aircraft are configured to be automatically controlled according to the one or more situational signals.

Clause 7. The system of any of Clauses 1-6, wherein one or more of the plurality of aircraft are unable to receive the ADS-B signals.

Clause 8. The system of any of Clauses 1-7, wherein the control unit is configured to determine the situational information independently of any of the plurality of aircraft having a capability of receiving the ADS-B signals.

Clause 9. The system of any of Clauses 1-8, wherein the control unit is an artificial intelligence or machine learning system.

Clause 10. A method comprising: determining, by a control unit, situational information regarding a plurality of aircraft within an airspace, wherein said determining is based on automatic dependent surveillance-broadcast (ADS-B) signals output by the plurality of aircraft and received by an ADS-B receiver of a tracking sub-system.

Clause 11. The method of Clause 10, further comprising outputting, by the control unit, one or more situational signals, wherein the one or more situational signals include at least a portion of the situational information.

Clause 12. The method of Clause 11, wherein said outputting comprises outputting the one or more situational signals to the one or more of the plurality of aircraft.

Clause 13. The method of Clauses 11 or 12, wherein the one or more situational signals include one or more recommended flight aspects for one or more of the aircraft based on the tracked positions of the plurality of aircraft within the airspace.

Clause 14. The method of Clause 13, wherein the one or more recommended flight aspects include a recommended altitude.

Clause 15. The method of any of Clauses 11-14, further comprising automatically controlling one or more of the plurality of aircraft according to the one or more situational signals.

Clause 16. The method of any of Clauses 10-15, wherein one or more of the plurality of aircraft are unable to receive the ADS-B signals.

Clause 17. The method of any of Clauses 10-16, wherein said determining comprises determining the situational information independently of any of the plurality of aircraft having a capability of receiving the ADS-B signals.

Clause 18. The method of any of Clauses 10-17, wherein the control unit is an artificial intelligence or machine learning system.

Clause 19. A non-transitory computer-readable storage medium comprising executable instructions that, in response to execution, cause one or more control units comprising a processor, to perform operations comprising:

determining situational information regarding a plurality of aircraft within an airspace, wherein said determining is based on automatic dependent surveillance-broadcast (ADS-B) signals output by the plurality of aircraft and received by an ADS-B receiver of a tracking sub-system; and outputting one or more situational signals, wherein the one or more situational signals include at least a portion of the situational information, and wherein the one or more situational signals include one or more recommended flight aspects for one or more of the aircraft based on the tracked positions of the plurality of aircraft within the airspace.

Clause 20. The non-transitory computer-readable storage medium of claim 19, wherein one or more of the plurality of aircraft are unable to receive the ADS-B signals, and wherein said determining includes determining the situational information independently of any of the plurality of aircraft having a capability of receiving the ADS-B signals.

As described herein, examples of the present disclosure provide systems and methods that provide improved situational awareness to aircraft within an airspace. Further, examples of the present disclosure provide systems and methods for communicating an optimum altitude for an aircraft to fly within an airspace, which in turn increases fuel efficiency and improves situational awareness.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a tracking sub-system including an automatic dependent surveillance-broadcast (ADS-B) receiver configured to receive ADS-B signals output by a plurality of aircraft within an airspace, wherein the tracking sub-system is remote from the plurality of aircraft within the airspace, and wherein one or more of the plurality of aircraft have ADS-B OUT capability, but not ADS-B IN capability;
a communication device remote from the plurality of aircraft within the airspace; and
a control unit including one or more processors in communication with the tracking sub-system and the communication device, wherein the control unit is remote from plurality of aircraft within the airspace, wherein the control unit is configured to:
determine situational information regarding the plurality of aircraft within the airspace from the ADS-B signals output by the plurality of aircraft and received by the ADS-B receiver of the tracking sub-system, and
output, via the communication device, one or more situational signals including the situational information regarding the plurality of aircraft within the airspace to a cloud-based server accessible by the plurality of aircraft within the airspace.

2. The system of claim 1, wherein the control unit is further configured to output the one or more situational signals to one or more of the plurality of aircraft.

3. The system of claim 1, wherein the one or more situational signals include one or more recommended flight aspects for one or more of the plurality of aircraft based on the tracked positions of the plurality of aircraft within the airspace.

4. The system of claim 3, wherein the one or more recommended flight aspects include a recommended altitude and a recommended separation distance with respect to one or more of the plurality of aircraft.

5. The system of claim 1, wherein one or more of the plurality of aircraft are configured to be automatically controlled according to the one or more situational signals.

6. The system of claim 1, wherein one or more of the plurality of aircraft when operating in the airspace are unable to receive ADS-B signals.

7. The system of claim 1, wherein the control unit is configured to determine the situational information independently of any of the plurality of aircraft having a capability of receiving the ADS-B signals.

8. The system of claim 1, wherein the control unit is an artificial intelligence or machine learning system.

9. The system of claim 1, wherein the situational information comprises:
   separation distances between the plurality of aircraft within the airspace; and
   altitudes of the plurality of aircraft within the airspace.

10. A method comprising:
    receiving, by a tracking sub-system including an automatic dependent surveillance-broadcast (ADS-B) receiver, ADS-B signals output by a plurality of aircraft within an airspace, wherein the tracking sub-system is remote from the plurality of aircraft within the airspace, and wherein one or more of the plurality of aircraft have ADS-B OUT capability, but not ADS-B IN capability;
    determining, by a control unit including one or more processors in communication with the tracking sub-system and a communication device remote from the plurality of aircraft within the airspace, situational information regarding the plurality of aircraft within the airspace from the ADS-B signals output by the plurality of aircraft and received by the tracking sub-system, and
    outputting, by the control unit via the communication device, one or more situational signals including the situational information regarding the plurality of aircraft within the airspace to a cloud-based server accessible by the plurality of aircraft within the airspace.

11. The method of claim 10, wherein said outputting comprises further outputting the one or more situational signals to the one or more of the plurality of aircraft.

12. The method of claim 10, wherein the one or more situational signals include one or more recommended flight aspects for one or more of the aircraft based on the tracked positions of the plurality of aircraft within the airspace.

13. The method of claim 12, wherein the one or more recommended flight aspects include a recommended altitude and a recommended separation distance with respect to one or more of the plurality of aircraft.

14. The method of claim 10, further comprising automatically controlling one or more of the plurality of aircraft according to the one or more situational signals.

15. The method of claim 10, wherein one or more of the plurality of aircraft when operating in the airspace are unable to receive ADS-B signals.

16. The method of claim 10, wherein said determining comprises determining the situational information independently of any of the plurality of aircraft having a capability of receiving the ADS-B signals.

17. The method of claim 10, wherein the control unit is an artificial intelligence or machine learning system.

18. The system of claim 10, wherein the situational information comprises:
    separation distances between the plurality of aircraft within the airspace; and
    altitudes of the plurality of aircraft within the airspace.

* * * * *